(12) United States Patent
Maede

(10) Patent No.: US 12,111,534 B2
(45) Date of Patent: Oct. 8, 2024

(54) DISPLAY DEVICE

(71) Applicant: Japan Display Inc., Tokyo (JP)

(72) Inventor: Yuji Maede, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

(21) Appl. No.: 18/328,783

(22) Filed: Jun. 5, 2023

(65) Prior Publication Data

US 2023/0393429 A1 Dec. 7, 2023

(30) Foreign Application Priority Data

Jun. 6, 2022 (JP) ................. 2022-091502

(51) Int. Cl.
| | |
|---|---|
| *G02F 1/1335* | (2006.01) |
| *G02F 1/1333* | (2006.01) |
| *G02F 1/13357* | (2006.01) |
| *G02F 1/1343* | (2006.01) |
| *G02F 1/1362* | (2006.01) |

(52) U.S. Cl.
CPC .. *G02F 1/133526* (2013.01); *G02F 1/133345* (2013.01); *G02F 1/133621* (2013.01); *G02F 1/134363* (2013.01); *G02F 1/136222* (2021.01); *G02F 1/136286* (2013.01); *G02F 2201/52* (2013.01)

(58) Field of Classification Search
None
See application file for complete search history.

(56) References Cited

U.S. PATENT DOCUMENTS

| | | | | |
|---|---|---|---|---|
| 2003/0081153 | A1* | 5/2003 | Kobayashi | ........ G02F 1/133512 349/95 |
| 2007/0097293 | A1 | 5/2007 | Nakanishi et al. | |
| 2008/0218461 | A1 | 9/2008 | Sugita et al. | |
| 2015/0092139 | A1* | 4/2015 | Eguchi | ................. G03B 21/208 349/95 |

FOREIGN PATENT DOCUMENTS

| | | |
|---|---|---|
| JP | 2003-337327 A | 11/2003 |
| JP | 2004-251992 A | 9/2004 |
| JP | 2005-196139 A | 7/2005 |
| JP | 2007-025109 A | 2/2007 |
| JP | 2008-216649 A | 9/2008 |
| JP | 2008-304523 A | 12/2008 |

* cited by examiner

*Primary Examiner* — Dung T Nguyen
(74) *Attorney, Agent, or Firm* — XSENSUS LLP

(57) ABSTRACT

According to one embodiment, a display device includes a first substrate including a plurality of switching elements, a plurality of signal lines connected to the plurality of switching elements, respectively, a plurality of color filters each provided between each adjacent pair of the plurality of signal lines, and a plurality of metal layers opposing the plurality of signal lines, respectively, a second substrate including a lens array including a plurality of lenses, and an insulating layer that covers the lens arrays, and a liquid crystal layer provided between the first substrate and the second substrate, wherein the plurality of lenses have a refractive index higher than that of the insulating layer.

5 Claims, 7 Drawing Sheets

DISPLAY DEVICE

CROSS-REFERENCE TO RELATED APPLICATIONS

This application is based upon and claims the benefit of priority from Japanese Patent Application No. 2022-091502 filed Jun. 6, 2022, the entire contents of which are incorporated herein by reference.

FIELD

Embodiments described herein relate generally to a display device.

BACKGROUND

Such a display device has been developed that can achieve high brightness by using a lens to collect light on a pixel-by-pixel basis.

DETAILED DESCRIPTION

Figure 1:
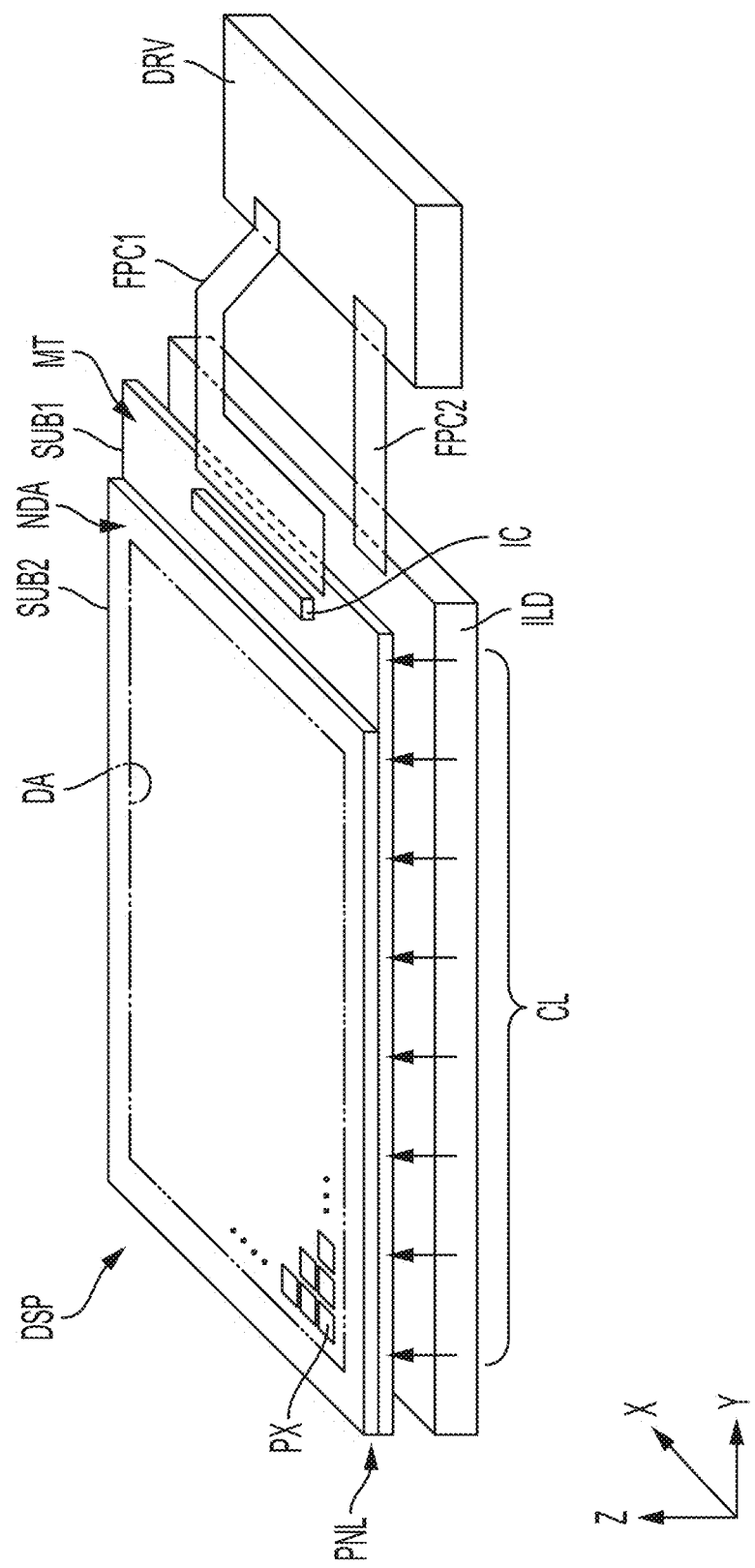
FIG. 1 is a perspective view showing schematically showing a configuration example of a display device according to an embodiment.

In general, according to one embodiment, a display device comprises
a first substrate including:
a plurality of switching elements;
a plurality of signal lines connected to the plurality of switching elements, respectively;
a plurality of color filters each provided between each adjacent pair of the plurality of signal lines; and
a plurality of metal layers opposing the plurality of signal lines, respectively;
a second substrate including:
a lens array including a plurality of lenses; and
an insulating layer that covers the lens arrays; and
a liquid crystal layer provided between the first substrate and the second substrate, wherein
the plurality of lenses have a refractive index higher than that of the insulating layer.

An object of the present embodiment is to provide a display device which can achieve a high brightness and a high contrast.

Embodiments will be described hereinafter with reference to the accompanying drawings. Note that the disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same or similar elements as or to those described in connection with preceding drawings or those exhibiting similar functions are denoted by like reference numerals, and a detailed description thereof is omitted unless otherwise necessary.

The embodiments described herein are not general ones, but rather embodiments that illustrate the same or corresponding special technical features of the invention. The following is a detailed description of one embodiment of a display device with reference to the drawings.

In this embodiment, a first direction X, a second direction Y and a third direction Z are orthogonal to each other, but may intersect at an angle other than 90 degrees. The direction toward the tip of the arrow in the third direction Z is defined as up or above, and the direction opposite to the direction toward the tip of the arrow in the third direction Z is defined as down or below. The first direction X, the second direction Y, and the third direction Z may as well be referred to as an X direction, a Y direction and a Z direction, respectively.

With such expressions as "the second member above the first member" and "the second member below the first member", the second member may be in contact with the first member or may be located away from the first member. In the latter case, a third member may be interposed between the first member and the second member. On the other hand, with such expressions as "the second member on the first member" and "the second member beneath the first member", the second member is in contact with the first member.

Further, it is assumed that there is an observation position to observe the display device on a tip side of the arrow in the third direction Z. Here, viewing from this observation position toward the X-Y plane defined by the first direction X and the second direction Y is referred to as plan view. Viewing a cross-section of the display device in the X-Z plane defined by the first direction X and the third direction Z or in the Y-Z plane defined by the second direction Y and the third direction Z is referred to as cross-sectional view.

EMBODIMENT

FIG. 1 is a perspective view showing schematically showing a configuration example of a display device according to the embodiment. A display device DSP comprises a display panel PNL, an illumination device ILD opposing the display panel PNL, a driver element IC that drives the display panel PNL, a control module DRV that controls the operation of the display panel PNL and the illumination device ILD, a flexible circuit board FPC1 and a flexible circuit board FPC2. The illumination device ILD may as well be an illumination device that emits collimated light CL.

In the display device DSP shown in FIG. 1, the shape of the display panel PNL in plan view is a rectangular with a short side parallel to the first direction X and a long side parallel to the second direction Y. The planar shape of the display panel PNL may be some other shape such as a square, a regular circle or an oval, for example.

The display panel PNL comprises a substrate SUB1, a substrate SUB2 opposing the substrate SUB1 and a liquid crystal layer (a liquid crystal layer LC to be described later) located between the substrate SUB1 and the substrate SUB2.

The display panel PNL includes a display area DA and a non-display area NDA. The display area DA is an area that displays images. The non-display area NDA is an area that does not display images. In the example shown in FIG. 1, the non-display area NDA surrounds the display area DA. The non-display area NDA can as well be referred to as a peripheral area or a frame area. The display panel PNL comprises a plurality of pixels PX, for example, aligned in a matrix in the display area DA.

The driver element IC is located in the non-display area NDA. In the example shown in FIG. 1, the driver element IC is mounted on a mounting portion MT of the substrate SUB1. The mounting portion MT is a part of the substrate SUB1, which does not overlap the second substrate SUB2. Note that the driver element IC may be mounted at some other location, such as on the flexible circuit board FPC1.

The flexible circuit board FPC1 electrically connects the display panel PNL and the control module DRV to each other. The flexible circuit board FPC2 electrically connects the illumination device BL and the control module DRV to each other. The flexible circuit board FPC1 transmits signals output from the control module DRV to the display panel PNL. The flexible circuit board FPC2 transmits signals output from the control module DRV to the illumination device ILD.

Figure 2:
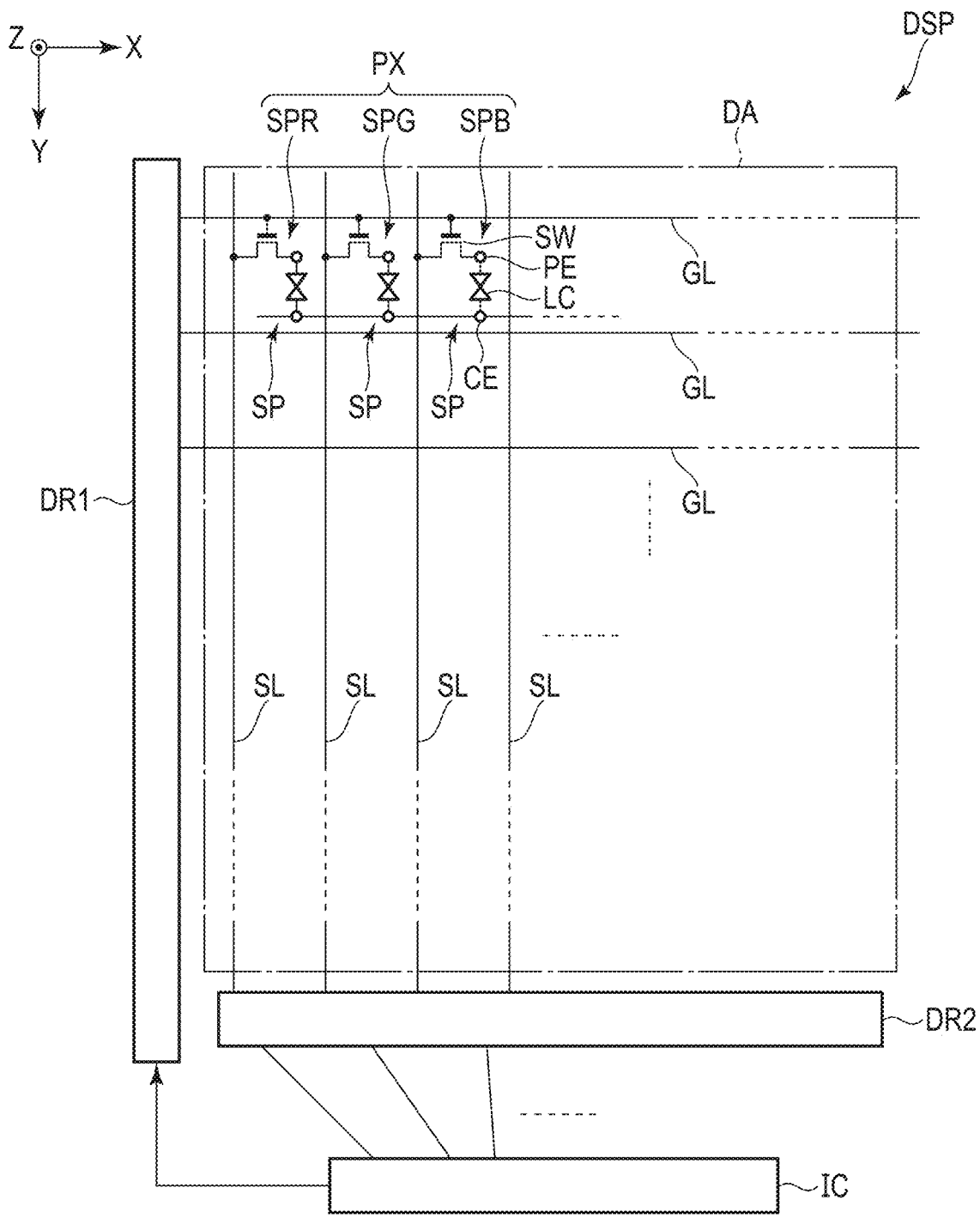
FIG. 2 is a diagram schematically showing an example of an equivalent circuit of the display device.

FIG. 2 is a diagram schematically showing an example of an equivalent circuit of the display device. The display device DSP comprises a scanning line drive circuit DR1, a signal line drive circuit DR2, a plurality of scanning lines GL connected to the scanning line drive circuit DR1 and a plurality of signal lines SL connected to the signal line drive circuit DR2. The plurality of scanning lines GL each extend along the first direction X in the display area DA and are arranged to be spaced apart from each other along the second direction Y. The plurality of signal lines SL each extend along the second direction Y in the display area DA and are arranged to be spaced apart from each other along the first direction X and intersect each of the scanning lines GL.

The pixels PX each includes a plurality of subpixels SP. For example, in this embodiment, it is assumed that one pixel PX contains one red subpixel SPR, one green subpixel SPG and one blue subpixel SPB. Note but that each pixel PX may further include a subpixel SP that displays white color, or the like, or may include a plurality of subpixels SP corresponding to the same color. Note that the subpixel may as well be referred to as a pixel.

In FIG. 2, each subpixel SP corresponds to a region compartmentalized by each respective pair of scanning lines GL adjacent to each other along the first direction X and each respective pair of signal lines SL adjacent to each other along the second direction Y. For each of the subpixels SP, a switching element SW and a pixel electrode PE are disposed. Further, a common electrode CE is formed over multiple subpixels SP. The common electrode CE is disposed to oppose the pixel electrode PE. To the common electrode CE, a common voltage is applied. The switching element SW is constituted by, for example, a thin-film transistor (TFT) and is connected to the respective scanning line GL, the respective signal line SL and the respective pixel electrode PE.

The scanning line GL is connected to the switching element SW in each of the subpixels SP aligned along the first direction X. The signal line SL is connected to the switching element SW in each of the subpixels SP aligned along the second direction Y. For example, between the common electrode CE and the pixel electrode PE, a storage capacitor is formed.

The scanning line drive circuit DR1 supplies scanning signals sequentially to each of the plurality of scanning lines GL. The signal line drive circuit DR2 selectively supplies video signals to each of the plurality of signal lines SL. When a scanning signal is supplied to the scanning line GL corresponding to a switching element SW and a video signal is supplied to the signal line SL connected to this switching element SW, a pixel voltage corresponding to this video signal is applied to the pixel electrode PE. At this time, by an electric field generated between the pixel electrode PE and the common electrode CE, the alignment of the liquid crystal molecules in the liquid crystal layer LC is changed from an initial alignment state where no voltage is being applied. With such an operation, images are displayed on the display area DA.

Figure 3:
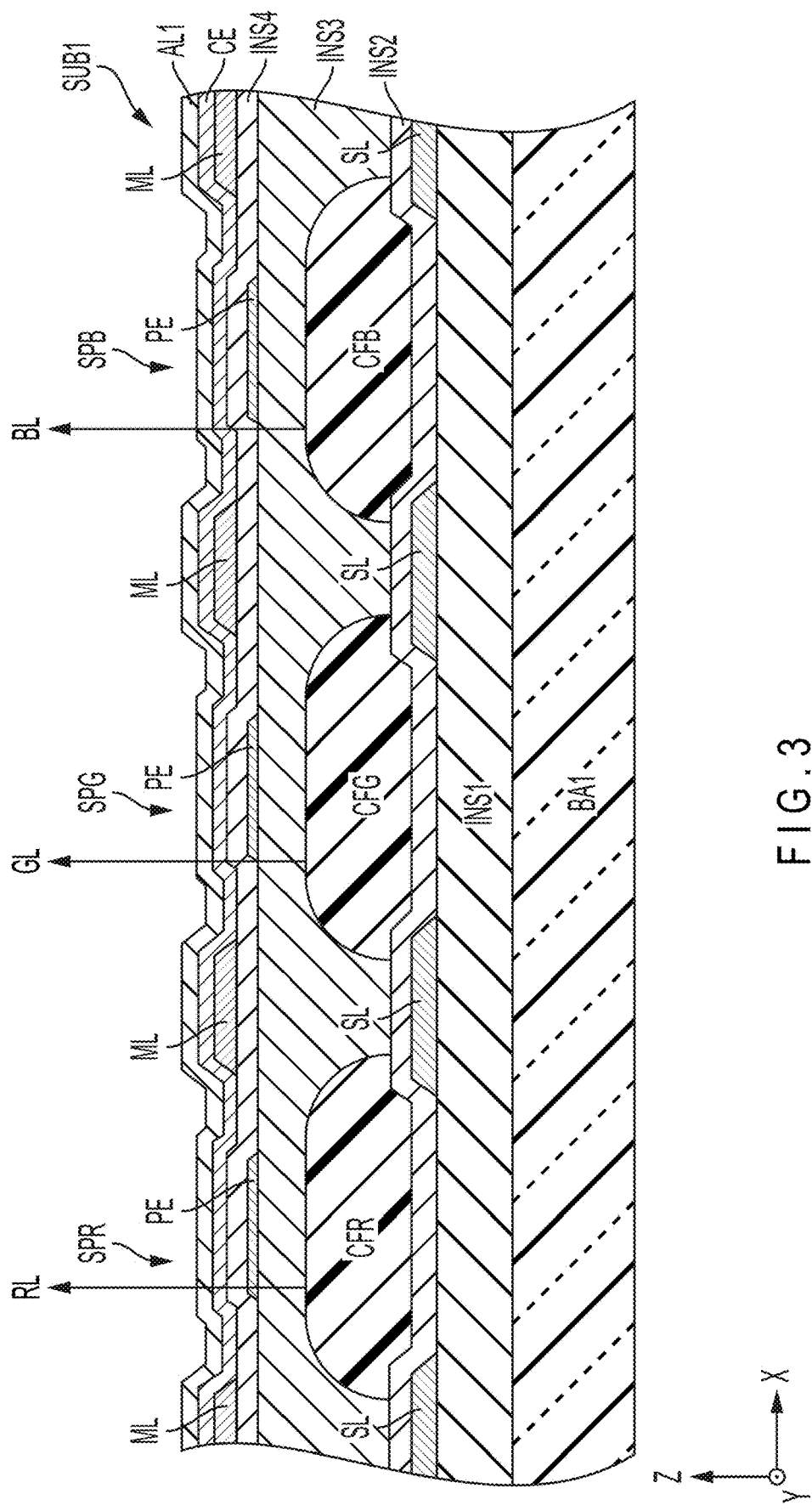
FIG. 3 is a cross-sectional view schematically showing a configuration example of the display device according to the embodiment.

FIG. 3 is a cross-sectional view schematically showing a configuration example of the display device according to the embodiment. The substrate SUB1 shown in FIG. 3 comprises a base BA1. The base BA1 can be formed of, for example, a resin material such as glass or polyimide.

The substrate SUB1 comprises an insulating layer INS1, an insulating layer INS2, an insulating layer INS3, a color filter CFR, a color filter CFG, a color filter CFB and a metal layer ML. The cross section shown in FIG. 3 illustrates signal lines SL, pixel electrodes PE and a common electrode CE as well. The color filter CFR, the color filter CFG and the color filter CFB are a red color filter, a green color filter, and a blue color filter, respectively.

The insulating layers INS1 is stacked on the base BA1 in sequence. Each signal line SL is disposed on the insulating layer INS1 in a respective boundary between a respective pair of subpixels adjacent to each other along the first direction X. The insulating layer INS2 covers the signal lines SL and the insulating layers INS1.

The color filter CFR is disposed on the insulating layer INS2 in the subpixel SPR. The color filter CFG is disposed on the insulating layer INS2 in the subpixel SPG. The color filter CFB is disposed on the insulating layer INS2 in the subpixel SPB. When light from the illumination device ILD passes through the color filter CFR, red transmission light RL is generated. When the light passes through the color filter CFG, green transmission light GL is generated, and when the light passes through the color filter CFB, blue transmission light BL is generated. When it is not necessary to distinguish the color filter CFR, the color filter CRG and the color filter CFB from each other, they may as well be referred to as color filters CF.

An aperture region of a subpixel SP is provided between each adjacent pair of signal lines SL. The pixel electrode PE, the common electrode CE and the color filter CF are provided to overcome the aperture region in plan view. Light emitted from the illumination device ILD passes through the aperture region. As the light passes through the color filter CF, it changes into light of the color corresponding to the subpixel SP. The light of the color is modulated by liquid crystal molecules driven by the electric field formed between the pixel electrode PE and the common electrode CE.

The insulating layer INS3 covers the color filter CFR, the color filter CFG, the color filter CFB and the insulating layer INS2. The insulating layer INS3 serves as a planarization layer that planarizes the unevenness caused by the color filter CFR, the color filter CFG, the color filter CFB and the like.

The pixel electrode PE is disposed on the insulating layer INS3 in each of the subpixel SPR, the subpixel SPG and the subpixel SPB. The insulating layer INS4 covers the pixel electrode PE and the insulating layer INS3. The metal layer ML is disposed on the insulating layer INS4 in each boundary between a respective pair of subpixels adjacent to each other along the first direction X, so as to oppose the signal line SL. The common electrode CE covers the insulating layer INS4 and the metal layer ML. The metal layer ML is in contact with the common electrode, and the same common voltage as that of the common electrode CE is applied to the metal layer ML. The metal layer ML serves to lower the resistance of the common electrode CE.

Although not illustrated in the cross section shown in FIG. 3, the common electrode CE includes a slit in each of the subpixel SPR, the subpixel SPG and the subpixel SPB. Through these slits, an electric field which acts on the liquid crystal layer LC is formed between the pixel electrode PE and the common electrode CE. Note that the display device DSP shown in FIG. 3 has such a configuration that the common electrode CE is disposed above the pixel electrode PE, but the embodiment is not limited to this configuration. The pixel electrode PE may as well be disposed above the common electrode CE.

The insulating layer INS1, the insulating layer INS2 and the insulating layer INS4 each can be formed of an inorganic material such as silicon nitride or silicon oxide. The insulating layer INS3 is an example of the organic insulating layer formed of an organic material such as acrylic resin. The alignment film AL1 can be formed of polyimide. The color filter CFR, the color filter CFG and the color filter CFB can be formed by negative resist, for example.

The pixel electrode PE and the common electrode CE can be formed of a transparent conductive material such as indium tin oxide (ITO). The signal lines SL, the metal layers ML and the scanning lines GL shown in FIG. 1 can be formed of a metallic material. The signal lines SL, the metal layers ML and the scanning lines GL may have a single-layer structure formed of a single metal material or a multilayer structure in which different types of metallic materials are stacked one on another.

The configuration of the substrate SUB1 is not limited to that of the example shown in FIG. 3. For example, the metal layers ML may be disposed between the common electrode CE and the insulating layer INS4. Further, the pixel electrode PE may be disposed above the common electrode CE (on the liquid crystal layer LC side). Furthermore, it may be formed using a low reflection material layer, below the signal lines SL and the scanning lines GL. In this manner, it is possible to reduce the reflection of external light.

The substrate SUB2 includes a base and an alignment film similar to those of the substrate SUB1. It is preferable that the substrate SUB2 should not include a light-shielding layer such as the so-called black matrix. With this configuration, the display quality of the display device DSP can be maintained well even if misalignment occurs while attaching the substrate SUB1 and the substrate SUB2 to each other.

Figure 4:
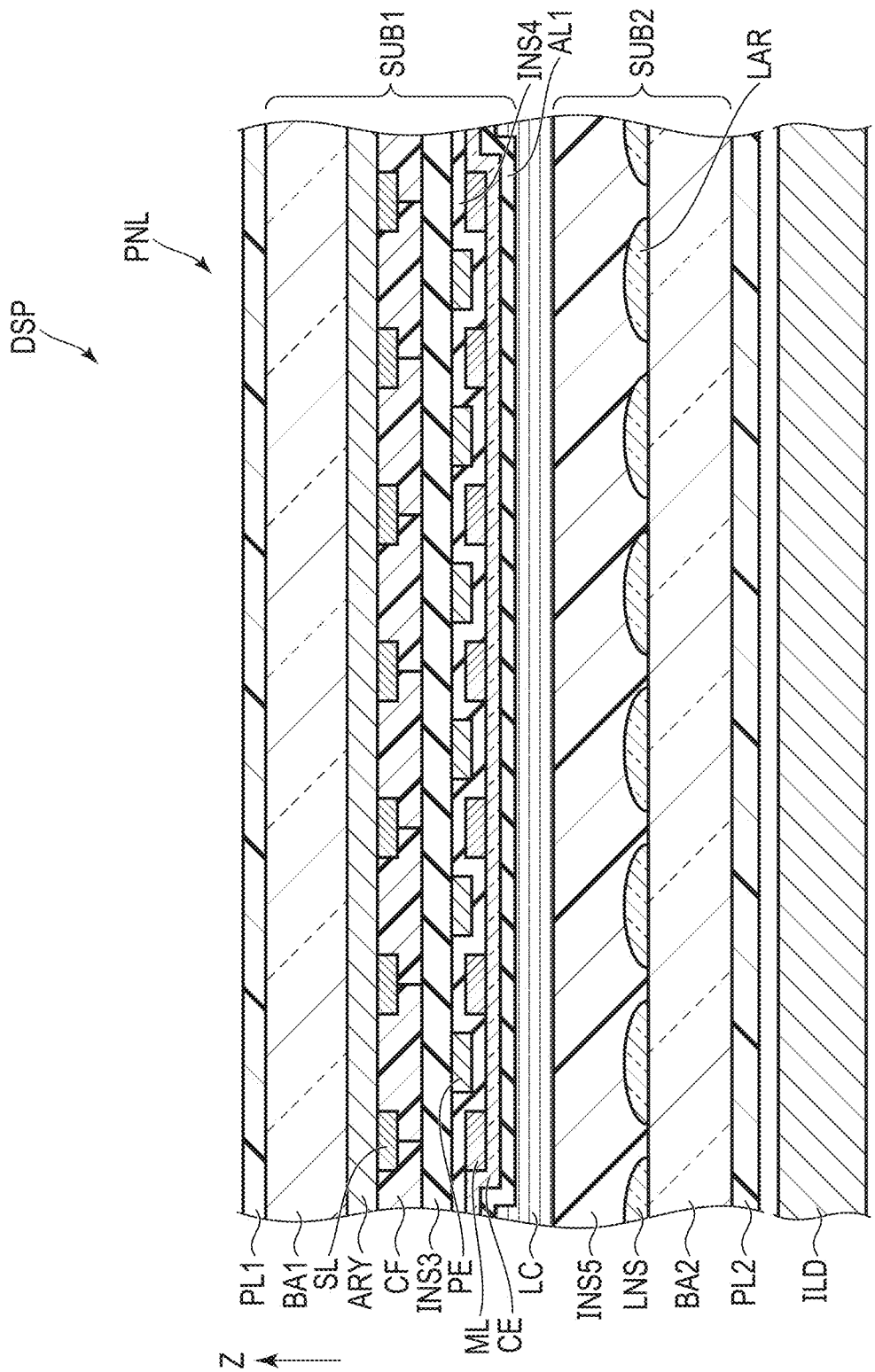
FIG. 4 is a cross-sectional view schematically showing a configuration example of the display device according to the embodiment.

FIG. 4 is a cross-sectional view schematically showing a configuration example of the display device of the embodiment. The display device DSP shown in FIG. 4 comprises a lens array LAR on the substrate SUB2. The lens array LAR includes a plurality of lenses LNS.

In the display device DSP shown in FIG. 4, the illumination device ILD and the display panel PNL are disposed along the third direction Z in this order. In the display panel PNL, the substrates SUB2 and SUB1 are disposed in this order along the third direction Z. The substrate SUB1 shown in FIG. 4 is the substrate SUB1 shown in FIG. 3 arranged upside down.

The substrate SUB2 comprises a polarizer PL2, a base BA2, a lens array LAR and an insulating layer INS5 along the third direction Z. The substrate SUB1 comprises, along a direction opposite to the third direction Z, a polarizer PL, a base BA1, an array layer ARY, signal lines SL, color filters CF, an insulating layer INS3, a common electrode CE and an alignment film AL1. Between the substrates SUB1 and SUB2, the liquid crystal layer LC is provided. On the insulating layer INS3, an insulating layer INS4 shown in FIG. 3 may be formed.

The base BA2 of the substrate SUB2 is formed of, for example, a resin material such as glass or polyimide as in the case of the base BA1.

The array layer ARY of the substrate SUB1 includes the scanning lines GL, the switching elements SW and the like described above.

The polarizer PL1 and the polarizer PL2 are in a cross-Nicol relationship in which their respective polarization axes cross orthogonal to each other.

The plurality of lenses LNS that constitute the lens array LAR are provided corresponding to each subpixel SP. The light incident on the substrate SUB2 from the illumination device ILD is focused by the lenses LNS, passes through the liquid crystal layer LC, and enters the substrate SUB1.

The substrate SUB1 includes a metal layer ML is provided therein as described above. However, the light entering the substrate SUB1 is focused by the lenses LNS, and therefore it passes through the substrate SUB1 with high luminance. In this manner, it is possible to provide a display device DSP that can display images at high luminance.

It is preferable that the lenses LNS of the substrate SUB2 should have a refractive index higher than that of the insulating layer INS5 that covers the lenses LNS (the lens array LAR). For example, the insulating layer INS5 is formed using acrylic resin and may have a refractive index of 1.5. On the other hand, the lenses LNS are formed using siloxane resin and should only have a refractive index of 1.8. With the lenses LNS, it is possible to focus the light emitted from the illumination device ILD.

By the film thickness of the insulating layer INS5, it is possible to adjust the positions on the structural components shown in FIG. 4, as to where light passing through the lens LNS should be focused. For example, the thickness of the insulating layer INS5 should only be 550 nm and the thickness of the lenses LNS (the lens array LAR) should only be 550 nm. By controlling by means of the film thickness of the insulating layer INS5, it is possible to focus the light at positions near to far distances. For example, the light passing through the lenses LNS and the liquid crystal layer LC may be focused on the common electrode CE provided on the substrate SUB1. In this case, the thickness of the insulating layer INS5 should only be, for example, 10 μm or more but 100 μm or less.

Note that in place of the lens array LAR including the lenses LNS, a corresponding lenticular lens may be provided corresponding to each subpixel SP. The lenticular lenses should only be arranged in line along the first direction X or the second direction Y. In this manner, the effect of high brightness can be obtained in the display device DSP.

As another example, the radius of curvature of the lenses LNS may be changed for each of the subpixel SPR, the subpixel SPG and the subpixel SPB, that is, according to the color of the color filter. In other words, lenses LNS having different radiuses of curvature may be provided according to the color of the color filter. By varying the radius of curvature, it is possible to correct the difference in the light focus point due to the wavelength of each color.

Further, the light passing through the lenses LNS should preferably be focused on a region of the area occupied by the subpixel SP, which is different from the light leakage area. In the display area DA, a plurality of spacers are provided to maintain the distance between the liquid crystal layers LC. The plurality of spacers are provided for each group of a predetermined number of subpixels SP.

Figure 5:
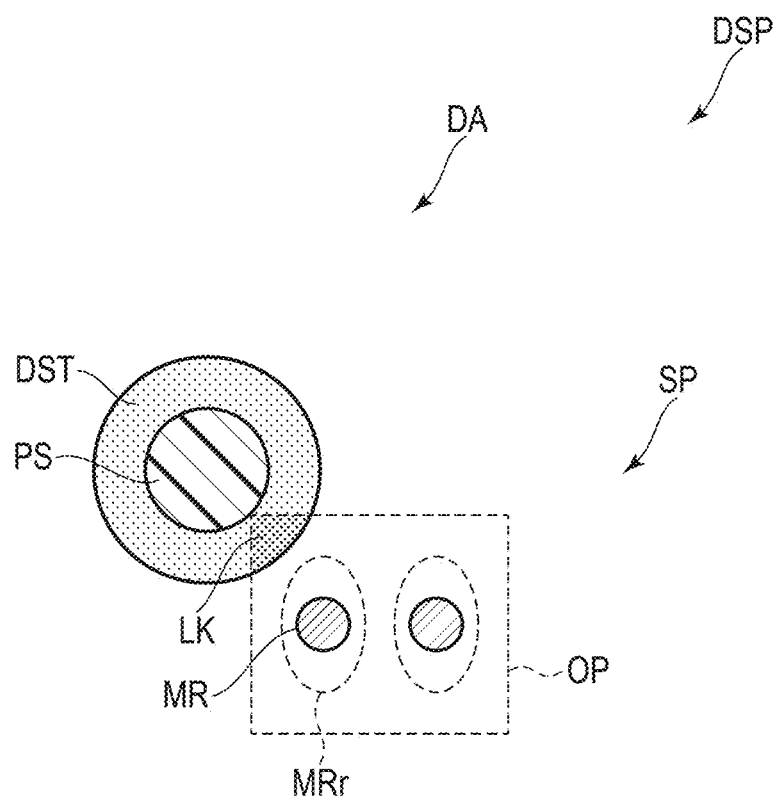
FIG. 5 is a plan view showing a subpixel located adjacent to a spacer.

FIG. 5 is a plan view of a subpixel located adjacent to a spacer. The subpixel SP includes an aperture region OP corresponding to the region where the pixel electrode PE is provided. When a region DST where the alignment of liquid crystal molecules around the spacer PS is disturbed overlaps the aperture region OP of the subpixel SP, a part of the aperture region OP may leak light. However, since the display device DSP of this embodiment has the lenses LNS, it is possible to focus light in a region different from such a light leakage region LK. As a result, even if a light leakage region LK occurs, display with high brightness can be achieved.

Further, the light passing through the lenses LNS may be focused on a region of the area occupied by the subpixel SP, that has a high liquid crystal modulation ratio. The liquid crystal molecules in the liquid crystal layer LC are driven by the electric field generated between the pixel electrode PE and the common electrode CE. Here, the modulation rate of the liquid crystal molecules varies according to the density of the electric field and the direction of the electric field. By focusing light in the area of high liquid crystal modulation rate, high brightness and high contrast of the display device DSP can be achieved.

In FIG. 5, the region MRr in the aperture region OP is a region with high liquid crystal modulation rate when no lens LNS (lens array LAR) is provided. On the other hand, the region MR is a region of light passing through the liquid crystal layer LC or common electrode CE when lenses LNS (the lens array LAR) are provided. Thus, by providing the lenses LNS (lens array LAR), the light focus point is aligned with the region of high liquid crystal modulation rate. Thus, it is possible to achieve high brightness and high contrast of the display device DSP.

Further, a metal layer may be formed in the region below the lenses LNS, where the lenses LNS are not formed, so as to reuse the light emitted from the illumination device ILD. With this configuration, high brightness of the display device DSP can be achieved.

Figure 6:
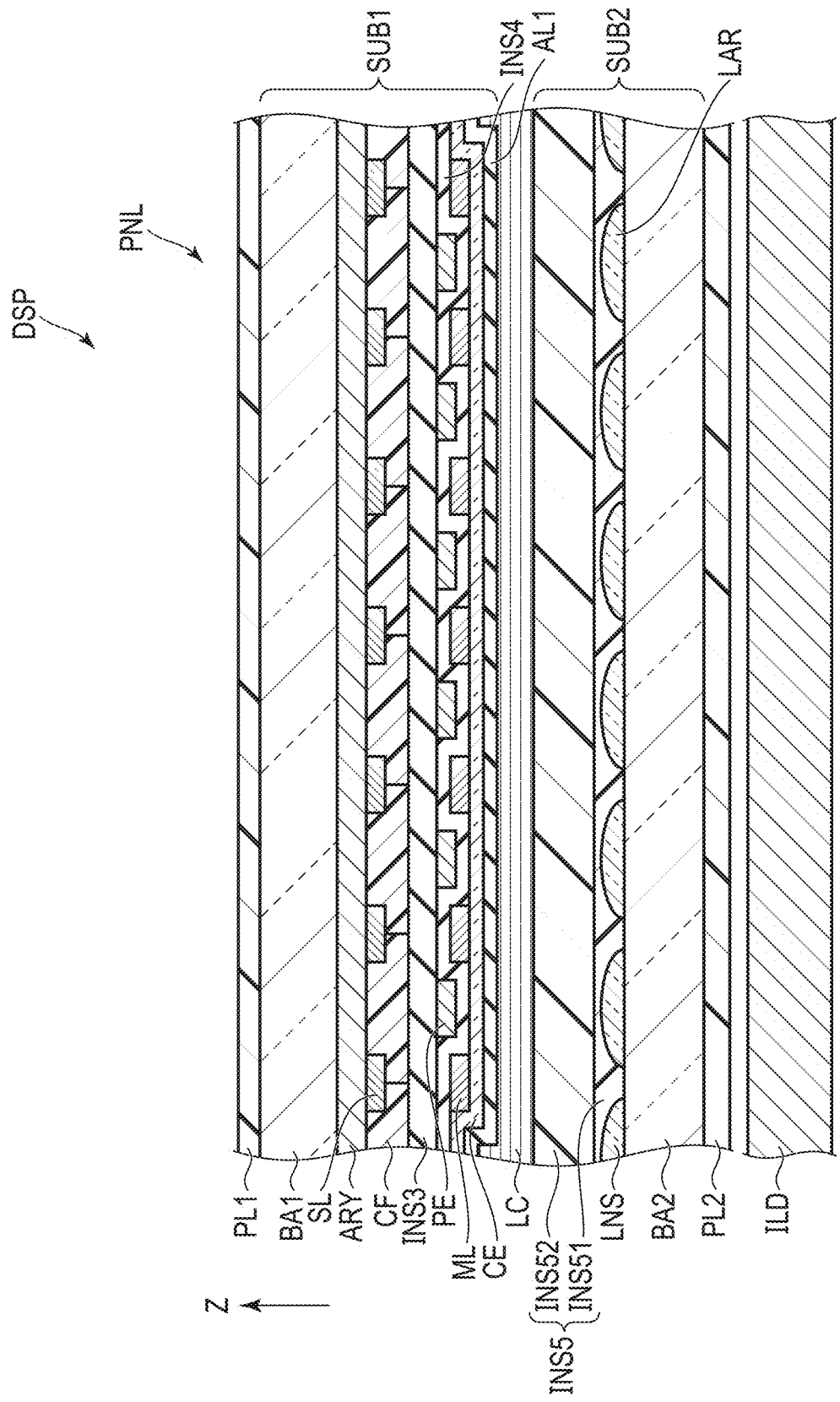
FIG. 6 is a cross-sectional view showing another configuration example of the display device of the embodiment.

FIG. 6 is a cross-sectional view showing another configuration example of the display device in the embodiment. The configuration example shown in FIG. 6 is different from that shown in FIG. 4 in that there are two insulating layers that cover the lens array.

The insulating layer INS5 shown in FIG. 6 is formed by two layered stacked films of the insulating layer INS51 and the insulating layer INS52. The lower insulating layer INS51 is an insulating layer that covers the lens array LAR. The upper insulating layer INS52 has the function of adjusting the focus point of light passing through the lenses LNS. The insulating layers INS51 and INS52 may be formed using different insulating materials.

As another configuration example, a diffusion layer and a lens array different from the lens array LAR may be provided above the array layer ARY of the substrate SUB1 so as to widen the viewing angle of the display device DSP.

Figure 7:
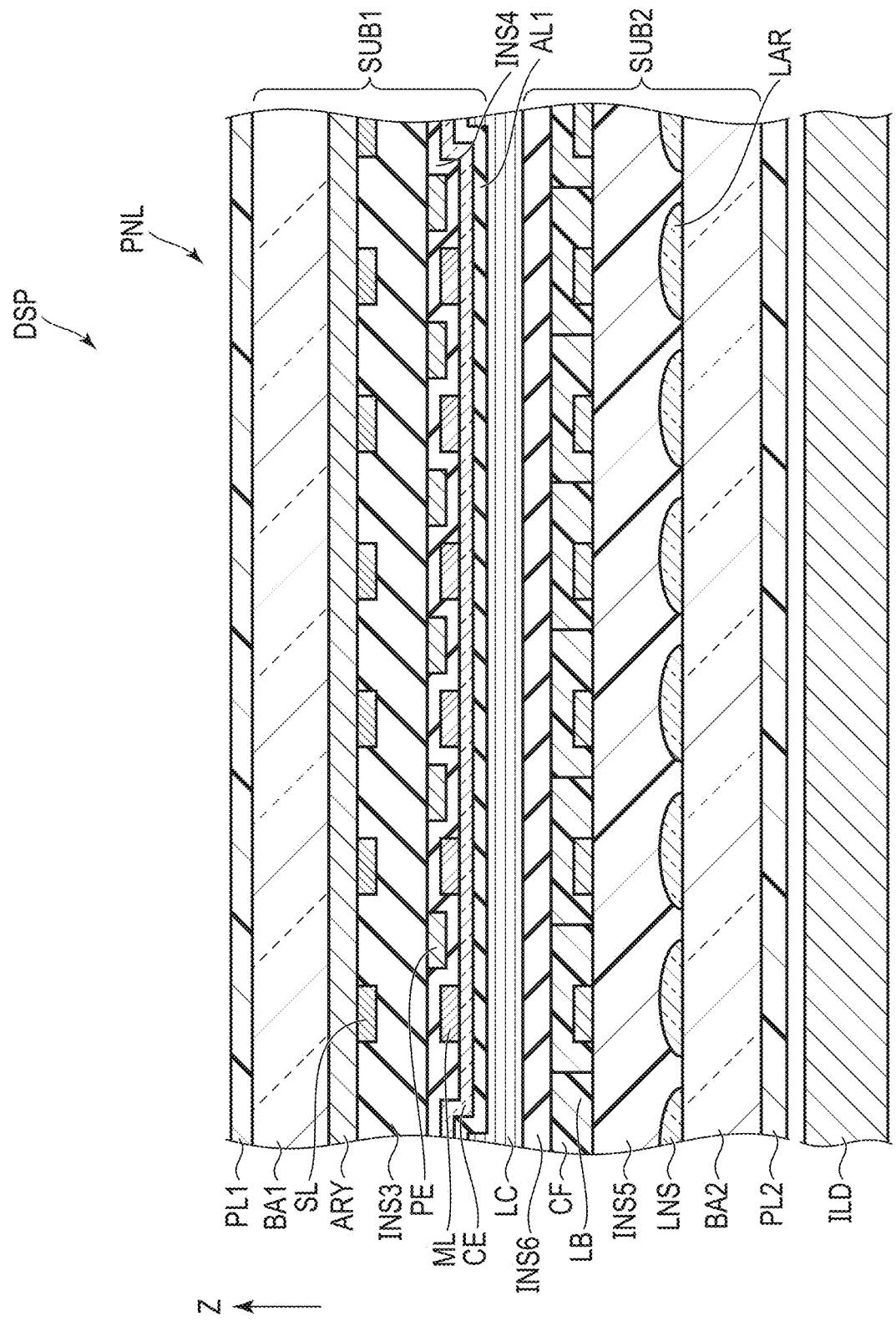
FIG. 7 is a plan view schematically showing still another configuration example of the display device of the embodiment.

FIG. 7 is a cross-sectional view showing still another configuration example of the display device in the embodiment. The configuration example shown in FIG. 7 is different from that of FIG. 4 in that the color filters are formed on the lens array.

In the substrate SUB1 shown in FIG. 7, the color filters CF are not provided and the signal lines SL are covered by the insulating layer INS3. In substrate SUB2, color filters CF are provided on insulating layer INS5. Between each adjacent pair of color filters of different colors, a light-shielding layer LB is provided so as to prevent color mixing. On the color filter CF, an insulating layer INS6 is provided. The insulating layer INS6 can only be formed by using an organic insulating layer in the same way as that of the insulating layer INS3.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
   a first substrate including:
      a plurality of switching elements;
      a plurality of signal lines connected to the plurality of switching elements, respectively;
      a plurality of color filters each provided between each adjacent pair of the plurality of signal lines;
      a first insulating layer covering the plurality of color filters;
      a plurality of pixel electrodes on the first insulating layer and connected to the plurality of switching elements, respectively;
      a second insulating layer covering the plurality of pixel electrodes;
      a common electrode on the second insulating layer and opposing the plurality of pixel electrodes; and
      a plurality of metal layers opposing the plurality of signal lines, respectively, and in contact with the common electrode;
   a second substrate including:
      a lens array including a plurality of lenses; and
      a third insulating layer that covers the lens arrays; and
   a liquid crystal layer provided between the first substrate and the second substrate, wherein
   the plurality of lenses have a refractive index higher than that of the insulating layer.

2. The display device according to claim 1, wherein the third insulating layer includes a fourth insulating layer that covers the lens array, and a fifth insulating layer different from the first insulating layer.

3. The display device according to claim 1, further comprising:
   an illumination device,
   wherein
   the illumination device emits red light, green light and blue light,
   the plurality of color filters includes a red color filter, a green color filter, and a blue color filter, and the red light is emitted to the red color filter, the green light is emitted to the green color filter, and the blue light is emitted to the blue color filter.

4. The display device according to claim 1, further comprising:
an illumination device,
wherein
the illumination device emits collimated light.

5. The display device according to claim 1, wherein
the plurality of color filters includes a red color filter, a green color filter and a blue color filter, and
the lenses have various radiuses of curvature according to colors of the red color filter, the green color filter and the blue color filter.

* * * * *